(12) United States Patent
Bortnikov et al.

(10) Patent No.: US 9,858,011 B2
(45) Date of Patent: Jan. 2, 2018

(54) REPOPULATING FAILED REPLICAS THROUGH MODIFIED CONSENSUS RECOVERY

(71) Applicant: International Business Machines Corporation, Armonk, NY (US)

(72) Inventors: Vita Bortnikov, Haifa (IL); Shlomit I. Shachor, Yokneam Eilit (IL); Ilya Shnayderman, Jerusalem (IL)

(73) Assignee: International Business Machines Corporation, Armonk, NY (US)

( * ) Notice: Subject to any disclaimer, the term of this patent is extended or adjusted under 35 U.S.C. 154(b) by 43 days.

(21) Appl. No.: 14/970,692

(22) Filed: Dec. 16, 2015

(65) Prior Publication Data

US 2017/0177232 A1    Jun. 22, 2017

(51) Int. Cl.
| | | |
|---|---|---|
| *G06F 12/00* | (2006.01) | |
| *G06F 13/00* | (2006.01) | |
| *G06F 13/28* | (2006.01) | |
| *G06F 3/06* | (2006.01) | |

(52) U.S. Cl.
CPC .............. *G06F 3/065* (2013.01); *G06F 3/067* (2013.01); *G06F 3/0619* (2013.01)

(58) Field of Classification Search
CPC ...... G06F 3/0614; G06F 3/0619; G06F 3/065; G06F 3/067; G06F 11/14; G06F 11/1446; G06F 11/1402; G06F 11/16; G06F 11/1658; G06F 11/1662; G06F 11/1666; G06F 11/167; G06F 11/1675; G06F 11/1679; G06F 11/1683; G06F 11/1687; G06F 11/1691; G06F 11/20; G06F 11/2056; G06F 11/2082; G06F 17/30197
See application file for complete search history.

(56) References Cited

U.S. PATENT DOCUMENTS

| | | | | |
|---|---|---|---|---|
| 6,401,120 B1* | 6/2002 | Gamache | ............ | G06F 11/1482 709/220 |
| 6,449,734 B1* | 9/2002 | Shrivastava | ........ | G06F 11/1425 707/999.008 |
| 6,460,039 B1* | 10/2002 | Pinter | .................... | G06F 9/5077 |
| 6,950,833 B2* | 9/2005 | Costello | .............. | G06F 11/2064 |
| 7,363,444 B2* | 4/2008 | Ji | .......................... | G06F 3/0617 711/161 |
| 7,647,329 B1* | 1/2010 | Fischman | ......... | G06F 17/30094 707/999.1 |
| 7,774,469 B2* | 8/2010 | Massa | ................. | G06F 11/1479 709/226 |

(Continued)

FOREIGN PATENT DOCUMENTS

JP    2015036834 A    2/2015

OTHER PUBLICATIONS

On the quorum requirement and value selection rule for Fast Paxos; Zhao, Wenbing; 5th IEEE International Conference on Software Engineering and Service Science; Jun. 27-29, 2014; pp. 406-409 (4 pages).*

(Continued)

*Primary Examiner* — Daniel C Chappell
(74) *Attorney, Agent, or Firm* — Stephanie L. Carusillo

(57) ABSTRACT

Using a quorum of fully updated replicas to designate a leader replica. A quorum of fully updated replicas designate a leader replica through "prepared" messages, allowing for restoration of failed replicas without a split-brain condition.

11 Claims, 2 Drawing Sheets

(56) References Cited

U.S. PATENT DOCUMENTS

| | | | |
|---|---|---|---|
| 7,856,502 B2 | 12/2010 | Lamport et al. | |
| 7,984,155 B2* | 7/2011 | Massa | G06F 11/1479 |
| | | | 709/226 |
| 8,046,413 B2 | 10/2011 | Howell et al. | |
| 8,296,398 B2* | 10/2012 | Lacapra | G06F 17/30206 |
| | | | 209/203 |
| 8,812,897 B1* | 8/2014 | Helmick | G06F 11/00 |
| | | | 707/763 |
| 8,856,593 B2 | 10/2014 | Eckhardt et al. | |
| 8,892,509 B2* | 11/2014 | Cattell | G06F 11/1666 |
| | | | 707/610 |
| 9,116,862 B1* | 8/2015 | Rath | G06F 11/2097 |
| 9,329,950 B2* | 5/2016 | Bortnikov | G06F 11/2028 |
| 9,418,130 B2* | 8/2016 | Leshchiner | G06F 17/30575 |
| 9,489,434 B1* | 11/2016 | Rath | G06F 17/30557 |
| 9,613,104 B2* | 4/2017 | Smith | G06F 11/1446 |
| 9,697,226 B1* | 7/2017 | Youngworth | G06F 3/0655 |
| 2005/0198106 A1* | 9/2005 | Lamport | G06F 11/182 |
| | | | 709/201 |
| 2006/0036896 A1* | 2/2006 | Gamache | G06F 11/1482 |
| | | | 714/4.1 |
| 2006/0090095 A1* | 4/2006 | Massa | G06F 11/1479 |
| | | | 714/4.11 |
| 2007/0192542 A1* | 8/2007 | Frolund | G06F 11/1064 |
| | | | 711/119 |
| 2007/0192544 A1* | 8/2007 | Frolund | G06F 11/1064 |
| | | | 711/135 |
| 2010/0114826 A1* | 5/2010 | Voutilainen | G06F 11/1425 |
| | | | 707/638 |
| 2013/0110774 A1* | 5/2013 | Shah | G06F 11/1474 |
| | | | 707/610 |
| 2013/0111261 A1* | 5/2013 | Dalton | G06F 17/30581 |
| | | | 714/4.11 |
| 2014/0074996 A1* | 3/2014 | Bortnikov | H04L 41/0816 |
| | | | 709/221 |
| 2014/0129519 A1* | 5/2014 | Leshchiner | G06F 17/30578 |
| | | | 707/613 |
| 2014/0188794 A1 | 7/2014 | Dalton | |
| 2016/0179711 A1* | 6/2016 | Oikarinen | G06F 3/061 |
| | | | 710/40 |

OTHER PUBLICATIONS

Using Paxos to build a scalable, consistent, and highly available datastore; Rao et al; Proceedings of the VLDB Endowment, vol. 4, iss. 4; 1/2-11; pp. 243-254 (12 pages).*

There is more consensus in Egalitarian parliaments; Moraru et al; Proceedings of the Twenty-Fourth ACM Symposium on Operating Systems Principles; Nov. 3-6, 2013; pp. 358-372 (15 pages).*

GlobLease: A globally consistent and elastic storage system using leases; Liu et al; 20th IEEE International Conference on Parallel and Distributed Systems; Dec. 16-19, 2014 (9 pages).*

Rollup: Non-Disruptive Rolling Upgrade with Fast Consensus-Based Dynamic Reconfigurations; Gramoli et al; IEEE Transactions on Parallel and Distributed Systems, vol. 27, iss. 9; Nov. 11, 2015; pp. 2711-2724 (14 pages).*

Moraru et al., "Paxos Quorum Leases: Fast Reads Without Sacrificing Writes", SOCC '14, Nov. 3-5, 2014, ACM, 13 pages.

* cited by examiner

REPOPULATING FAILED REPLICAS THROUGH MODIFIED CONSENSUS RECOVERY

BACKGROUND

The present invention relates generally to the field of error detection and fault recovery, and more particularly to data processing system error or fault handling.

Replication is an approach to providing high availability and scalability of data. In a replicated service, redundancies are created by copying (sometimes also called replicating) data across various servers. That is, each server in a plurality of servers has a copy of the replicated data (sometimes also called a replica). This allows the replicated service to access the replicated data even if a subset of the plurality of servers experiences a failure. Thus, the replicated service remains operational.

However, various methods of replicating the data result in slightly different versions of the replicated data. This is sometimes called an inconsistency, a split-brain, and/or a divergence. Timing can cause some instances of a split-brain. Additionally, various replicas are unaware of a split-brain. This can result in cycles of a plurality of replicas proposing competing commands (sometimes also called dueling).

SUMMARY

According to an aspect of the present invention, there is a method, computer program product, and/or system that performs the following operations (not necessarily in the following order): (i) determining a first subset of replicas in a set of replicas; (ii) designating a leader replica in the first subset of replicas; and (iii) repopulating a second subset of replicas in the set of replicas based, at least in part, on a set of commands received by the leader replica. The first subset of replicas are fully updated replicas. At least designating the leader replica in the first set of replicas is performed by computer software running on computer hardware.

DETAILED DESCRIPTION

Figure 1:
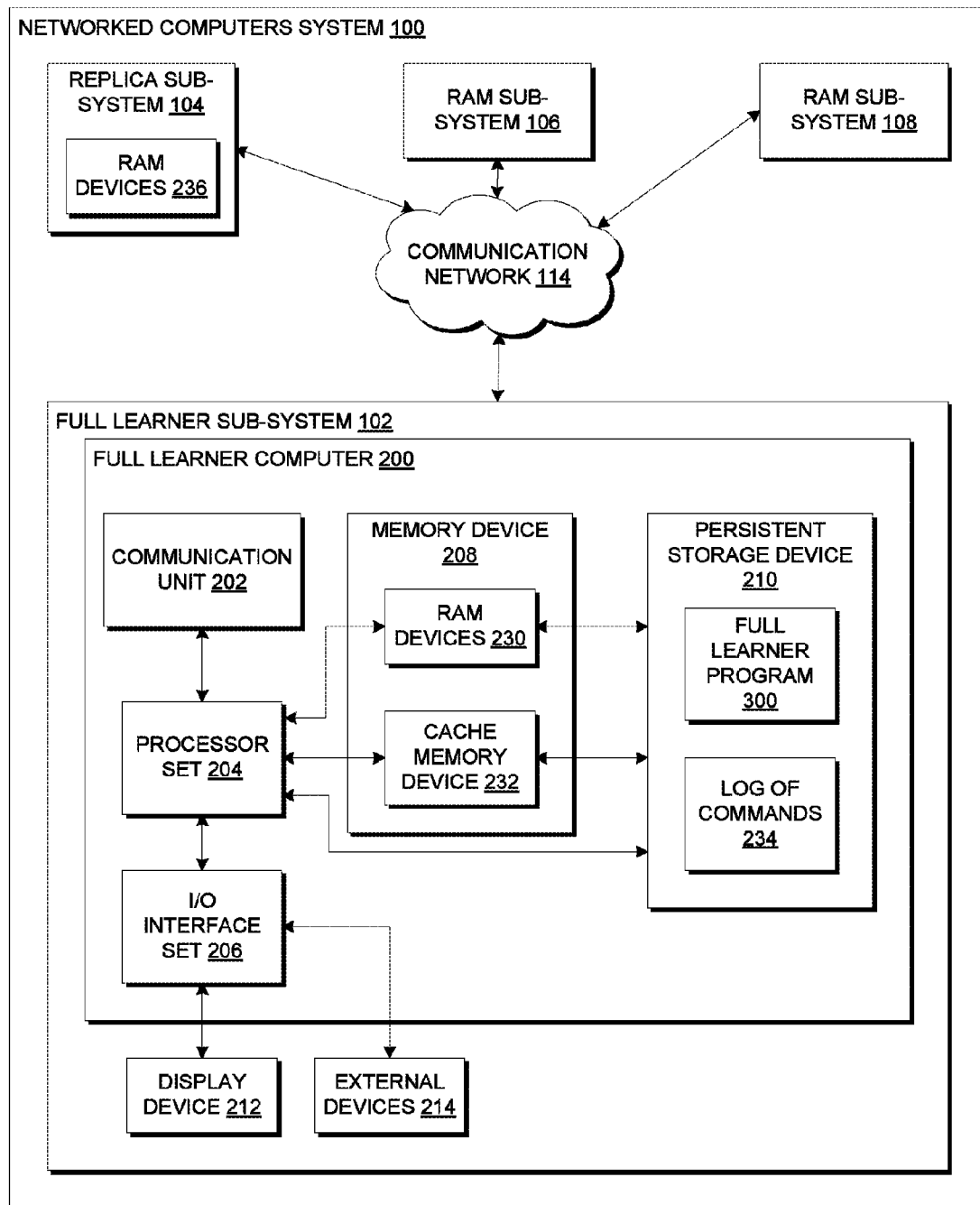
FIG. 1 is a block diagram view of a first embodiment of a system according to the present invention.

Using a quorum of fully updated replicas to designate a leader replica. A quorum of fully updated replicas designate a leader replica through "prepared" messages, allowing for restoration of failed replicas without a split-brain condition. This Detailed Description section is divided into the following sub-sections: (i) Hardware and Software Environment; (ii) Comments and/or Embodiments; and (iii) Definitions.

I. Hardware And Software Environment

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

An embodiment of a possible hardware and software environment for software and/or methods according to the present invention will now be described in detail with reference to the Figures. FIG. 1 is a functional block diagram illustrating various portions of networked computers system 100, including: full learner sub-system 102; replica sub-system 104; random access memory (RAM) sub-systems 106, 108; and communication network 114. Full learner sub-system 102 contains: full learner computer 200; display device 212; and external devices 214. Full learner computer 200 contains: communication unit 202; processor set 204; input/output (I/O) interface set 206; memory device 208; and persistent storage device 210. Memory device 208 contains: random access memory (RAM) devices 230; and cache memory device 232. Persistent storage device 210 contains: log of commands 234; and full learner program 300. Log of commands 234 is a log of commands ordered to a set of replicas. Replica sub-system 104 contains: random access memory (RAM) devices 236. RAM devices 236 are a set of RAM devices on which a set of replicas store data.

Full learner sub-system 102 is, in many respects, representative of the various computer sub-systems in the present invention. Accordingly, several portions of full learner sub-system 102 will now be discussed in the following paragraphs.

Full learner sub-system 102 may be a laptop computer, a tablet computer, a netbook computer, a personal computer (PC), a desktop computer, a personal digital assistant (PDA), a smart phone, or any programmable electronic device capable of communicating with client sub-systems via communication network 114. Full learner program 300 is a collection of machine readable instructions and/or data that is used to create, manage, and control certain software functions that will be discussed in detail, below, in the Example Embodiment sub-section of this Detailed Description section.

Full learner sub-system 102 is capable of communicating with other computer sub-systems via communication network 114. Communication network 114 can be, for example, a local area network (LAN), a wide area network (WAN) such as the Internet, or a combination of the two, and can include wired, wireless, or fiber optic connections. In general, communication network 114 can be any combination of connections and protocols that will support communications between full learner sub-system 102 and client sub-systems.

Full learner sub-system 102 is shown as a block diagram with many double arrows. These double arrows (no separate reference numerals) represent a communications fabric, which provides communications between various components of full learner sub-system 102. This communications fabric can be implemented with any architecture designed for passing data and/or control information between processors (such as microprocessors, communications processors, and/or network processors, etc.), system memory, peripheral devices, and any other hardware components within a system. For example, the communications fabric can be implemented, at least in part, with one or more buses.

Memory device 208 and persistent storage device 210 are computer readable storage media. In general, memory device 208 can include any suitable volatile or non-volatile computer readable storage media. It is further noted that, now and/or in the near future: (i) external devices 214 may be able to supply some, or all, memory for full learner sub-system 102; and/or (ii) devices external to full learner sub-system 102 may be able to provide memory for full learner sub-system 102.

Full learner program 300 is stored in persistent storage device 210 for access and/or execution by one or more processors of processor set 204, usually through memory device 208. Persistent storage device 210: (i) is at least more persistent than a signal in transit; (ii) stores the program (including its soft logic and/or data) on a tangible medium (such as magnetic or optical domains); and (iii) is substantially less persistent than permanent storage. Alternatively, data storage may be more persistent and/or permanent than the type of storage provided by persistent storage device 210.

Full learner program 300 may include both substantive data (that is, the type of data stored in a database) and/or machine readable and performable instructions. In this particular embodiment (i.e., FIG. 1), persistent storage device 210 includes a magnetic hard disk drive. To name some possible variations, persistent storage device 210 may include a solid-state hard drive, a semiconductor storage device, a read-only memory (ROM), an erasable programmable read-only memory (EPROM), a flash memory, or any other computer readable storage media that is capable of storing program instructions or digital information.

The media used by persistent storage device 210 may also be removable. For example, a removable hard drive may be used for persistent storage device 210. Other examples include optical and magnetic disks, thumb drives, and smart cards that are inserted into a drive for transfer onto another computer readable storage medium that is also part of persistent storage device 210.

Communication unit 202, in these examples, provides for communications with other data processing systems or devices external to full learner sub-system 102. In these examples, communication unit 202 includes one or more network interface cards. Communication unit 202 may provide communications through the use of either or both physical and wireless communications links. Any software modules discussed herein may be downloaded to a persistent storage device (such as persistent storage device 210) through a communications unit (such as communication unit 202).

I/O interface set 206 allows for input and output of data with other devices that may be connected locally in data communication with full learner computer 200. For example, I/O interface set 206 provides a connection to external devices 214. External devices 214 will typically include devices, such as a keyboard, a keypad, a touch screen, and/or some other suitable input device. External devices 214 can also include portable computer readable storage media, such as, for example, thumb drives, portable optical or magnetic disks, and memory cards. Software and data used to practice embodiments of the present invention (e.g., full learner program 300) can be stored on such portable computer readable storage media. In these embodiments, the relevant software may (or may not) be loaded, in whole or in part, onto persistent storage device 210 via I/O interface set 206. I/O interface set 206 also connects in data communication with display device 212.

Display device 212 provides a mechanism to display data to a user and may be, for example, a computer monitor or a smart phone display screen.

The programs described herein are identified based upon the application for which they are implemented in a specific embodiment of the invention. However, it should be appreciated that any particular program nomenclature herein is used merely for convenience, and thus, the invention should not be limited to use solely in any specific application identified and/or implied by such nomenclature.

The descriptions of the various embodiments of the present invention have been presented for purposes of illustration but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

II. Comments and/or Embodiments

Figure 2:
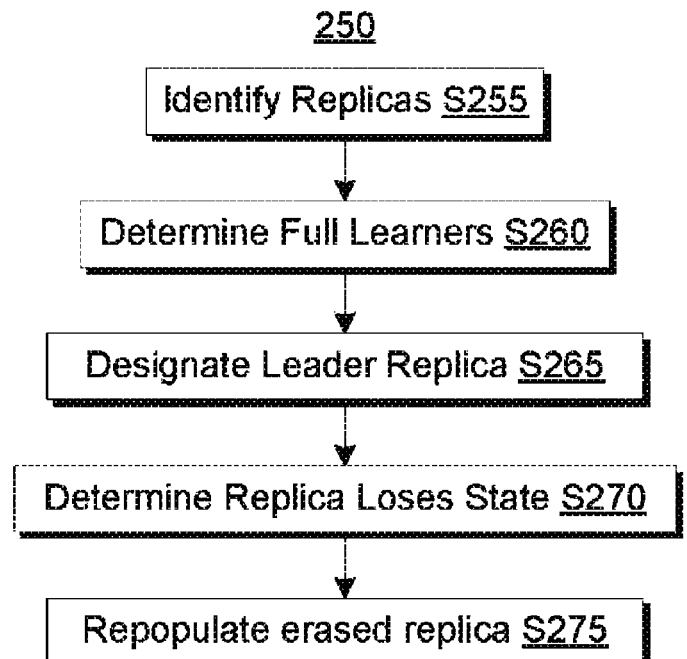
FIG. 2 is a flowchart showing a first embodiment method performed, at least in part, by the first embodiment system.
Figure 3:
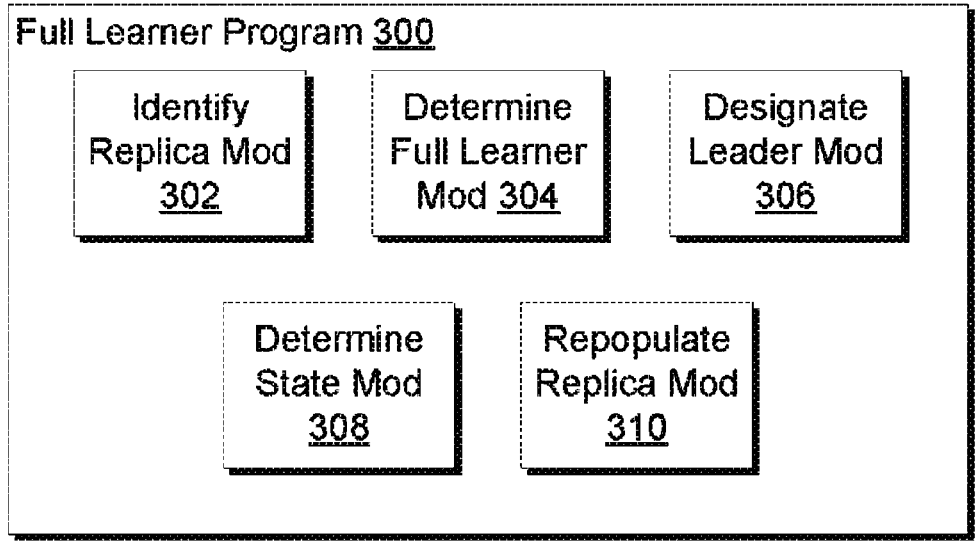
FIG. 3 is a block diagram view of a machine logic (e.g., software) portion of the first embodiment system.

FIG. 2 shows flowchart 250 depicting a method according to the present invention. FIG. 3 shows full learner program 300, which performs at least some of the method operations of flowchart 250. This method and associated software will now be discussed, over the course of the following paragraphs, with extensive reference to FIG. 2 (for the method operation blocks) and FIG. 3 (for the software blocks).

Processing begins at operation S255, where identify replica module ("mod") 302 identifies a set of replicas. In some embodiments of the present invention, identify replica mod 302 identifies a set of replicas that store data to a disk. In some of these embodiments, identify replica mod 302 identifies a set of replicas that store data on random access memory ("RAM"). In further embodiments, identify replica mod 302 identifies a set of replicas that are experiencing a split-brain. In alternative embodiments, identify replica mod 302 identifies a set of replicas employing a set of Paxos protocols. In some embodiments, identify replica mod 302 identifies a set of replicas that write commands to log of commands 234.

Processing proceeds to operation S260, where determine full learner mod 304 determines a set of full learner replicas. A full learner replica is sometimes also called an updated replica or a fully updated replica. In some embodiments of the present invention, determine full learner mod 304 determines that a subset of a set of replicas contain fully updated information. In further embodiments, determine full learner mod 304 determines that a replica in the set of replicas is a full learner based, at least in part, on a determination that the replica has incorporated all commands. In other embodiments, determine full learner mod 304 determines that a replica in a set of replicas is a full learner based, at least in part, on an ability of the replica to successfully order a set of commands. In some of these embodiments, determine full learner mod 304 determines that a replica in a set of replicas is a full learner based, at least in part, on an ability of the replica to successfully order a set of commands and that the set of commands are adopted by the set of replicas. In further embodiments, determine full learner mod 304 determines that a set of full learner replicas has received equivalent sets of commands.

Processing proceeds to operation S265, where designate leader mod 306 designates a replica as a leader replica. A leader replica is a first replica that can propose commands to a set of other replicas. In some embodiments of the present invention, designate leader mod 306 designates a replica as a leader replica based, at least in part, on the leader replica receiving a message from a subset of the set of full learner replicas. In some of these embodiments, designate leader mod 306 designates a replica as a leader replica based, at least in part, on the leader replica receiving a "prepared" message from a subset of the set of full learner replicas. A "prepared" message is a message from a first replica informing a set of other replicas that the first replica is prepared to receive commands. In further embodiments, designate leader mod 306 designates a replica as a leader replica based, at least in part on the leader replica receiving a "prepared" message from all replicas. Alternatively, designate leader mod 306 designates a replica as a leader replica based, at least in part on the leader replica receiving a "prepared" message from a quorum of the set of full learner replicas. In some embodiments, designate leader mod 306 determines a quorum of the set of full learner replicas is a majority of the set of full learner replicas.

Processing proceeds to operation S270, where determine state mod 308 determines a set of replicas lose a state. In some embodiments of the present invention, determine state mod 308 determines that a leader replica loses a state. In some of these embodiments, determine state mod 308 determines a set of replicas loses a state based, at least in part, on a server failure and/or the set of replicas being disconnected. In alternative embodiments, determine state mod 308 determines that at least half of a set of replicas lose a state. In further embodiments, determine state mod 308 determines that a subset of a set of full learner replicas loses a state.

Processing terminates at operation S275, where repopulate replica mod 310 repopulates a set of replicas. In some embodiments of the present invention, repopulate replica mod 310 repopulates a set of replicas that lost a state. In further embodiments, repopulate replica mod 310 repopulates a set of replicas that lost a state using a set of full learner replicas. In some of these embodiments, repopulate replica mod 310 repopulates a set of replicas that lost a state using a quorum of a set of full learner replicas. In other embodiments, repopulate replica mod 310 determines a quorum is a majority. In further embodiments, repopulate replica mod 310 repopulates a leader replica that is failing.

Some embodiments of the present invention recognize the following facts, potential problems, and/or potential areas for improvement with respect to the current state of the art: (i) using time leases to update a replica system does not prevent a split-brain situation; (ii) using standard Paxos protocols can result in input/output per second (IOPS) bottlenecks; and/or (iii) using standard Paxos protocol guarantees slows replication.

Some embodiments of the present invention may include one, or more, of the following features, characteristics, and/or advantages: (i) confirming a set of commands before writing the set of commands to a disk; (ii) avoiding IOPS bottlenecks; (iii) avoiding limitations of replicas saving data to stable storage; (iv) relaxing Paxos guarantees; (v) causing a set of replicas distributed over various servers to act as if the set of replicas are on a single server.

Paxos guarantees are: (i) non-triviality; (ii) safety; and (iii) liveness. Non-triviality is the guarantee that a replica can only receive a proposed value. Safety is the guarantee that all replicas will lean the same proposed value. Liveness is the guarantee that a replica will, eventually, learn the proposed value. In some embodiments of the present invention, a full learner sub-system allows a user to access all data written to a set of replicas. In further embodiments, a full learner sub-system does not allow for errors in which data is written to a replica, but cannot be read at a later time.

Some embodiments of the present invention may include one, or more, of the following features, characteristics, and/or advantages: (i) providing strong consistency semantics among various replicas; (ii) assuring that powerful invariants about data semantics hold; (iii) retaining consistency (safety) in the face of network partitions; (iv) providing liveness under realistic conditions; (v) tolerating replica failures and/or server failures in a seamless fashion; (vi) providing efficient (low latency) update processing; and/or (vii) providing efficient update processing by only requiring a quorum of full learners to receive an update.

Some embodiments of the present invention may include one, or more, of the following features, characteristics, and/or advantages: (i) enabling Paxos-based algorithms to replicate data in memory only; (ii) enabling Paxos-based algorithms to replicate data in memory without risking a split-brain; and/or (iii) relaxing paxos guarantees to prevent and/or avoid a split-brain.

III. Definitions

"Present invention" does not create an absolute indication and/or implication that the described subject matter is covered by the initial set of claims, as filed, by any as-amended set of claims drafted during prosecution, and/or by the final set of claims allowed through patent prosecution and included in the issued patent. The term "present invention" is used to assist in indicating a portion or multiple portions of the disclosure that might possibly include an advancement or multiple advancements over the state of the art. This understanding of the term "present invention" and the indications and/or implications thereof are tentative and provisional and are subject to change during the course of patent prosecution as relevant information is developed and as the claims may be amended.

"Embodiment," see the definition for "present invention."

"And/or" is the inclusive disjunction, also known as the logical disjunction and commonly known as the "inclusive or." For example, the phrase "A, B, and/or C," means that at least one of A or B or C is true; and "A, B, and/or C" is only false if each of A and B and C is false.

A "set of" items means there exists one or more items; there must exist at least one item, but there can also be two, three, or more items. A "subset of" items means there exists one or more items within a grouping of items that contain a common characteristic.

A "plurality of" items means there exists at more than one item; there must exist at least two items, but there can also be three, four, or more items.

"Includes" and any variants (e.g., including, include, etc.) means, unless explicitly noted otherwise, "includes, but is not necessarily limited to."

A "user" or a "subscriber" includes, but is not necessarily limited to: (i) a single individual human; (ii) an artificial intelligence entity with sufficient intelligence to act in the place of a single individual human or more than one human; (iii) a business entity for which actions are being taken by a single individual human or more than one human; and/or (iv) a combination of any one or more related "users" or "subscribers" acting as a single "user" or "subscriber."

The terms "receive," "provide," "send," "input," "output," and "report" should not be taken to indicate or imply, unless otherwise explicitly specified: (i) any particular degree of directness with respect to the relationship between an object and a subject; and/or (ii) a presence or absence of a set of intermediate components, intermediate actions, and/or things interposed between an object and a subject.

A "module" is any set of hardware, firmware, and/or software that operatively works to do a function, without regard to whether the module is: (i) in a single local proximity; (ii) distributed over a wide area; (iii) in a single proximity within a larger piece of software code; (iv) located within a single piece of software code; (v) located in a single storage device, memory, or medium; (vi) mechanically connected; (vii) electrically connected; and/or (viii) connected in data communication. A "sub-module" is a "module" within a "module."

A "computer" is any device with significant data processing and/or machine readable instruction reading capabilities including, but not necessarily limited to: desktop computers; mainframe computers; laptop computers; field-programmable gate array (FPGA) based devices; smart phones; personal digital assistants (PDAs); body-mounted or inserted computers; embedded device style computers; and/or application-specific integrated circuit (ASIC) based devices.

"Electrically connected" means either indirectly electrically connected such that intervening elements are present or directly electrically connected. An "electrical connection" may include, but need not be limited to, elements such as capacitors, inductors, transformers, vacuum tubes, and the like.

"Mechanically connected" means either indirect mechanical connections made through intermediate components or direct mechanical connections. "Mechanically connected" includes rigid mechanical connections as well as mechanical connection that allows for relative motion between the mechanically connected components. "Mechanically connected" includes, but is not limited to: welded connections; solder connections; connections by fasteners (e.g., nails, bolts, screws, nuts, hook-and-loop fasteners, knots, rivets, quick-release connections, latches, and/or magnetic connections); force fit connections; friction fit connections; connections secured by engagement caused by gravitational forces; pivoting or rotatable connections; and/or slidable mechanical connections.

A "data communication" includes, but is not necessarily limited to, any sort of data communication scheme now known or to be developed in the future. "Data communications" include, but are not necessarily limited to: wireless communication; wired communication; and/or communication routes that have wireless and wired portions. A "data communication" is not necessarily limited to: (i) direct data communication; (ii) indirect data communication; and/or (iii) data communication where the format, packetization status, medium, encryption status, and/or protocol remains constant over the entire course of the data communication.

The phrase "without substantial human intervention" means a process that occurs automatically (often by operation of machine logic, such as software) with little or no human input. Some examples that involve "no substantial human intervention" include: (i) a computer is performing complex processing and a human switches the computer to an alternative power supply due to an outage of grid power so that processing continues uninterrupted; (ii) a computer is about to perform resource intensive processing and a human confirms that the resource-intensive processing should indeed be undertaken (in this case, the process of confirmation, considered in isolation, is with substantial human intervention, but the resource intensive processing does not include any substantial human intervention, notwithstanding the simple yes—no style confirmation required to be made by a human); and (iii) using machine logic, a computer has made a weighty decision (for example, a decision to ground all airplanes in anticipation of bad weather), but, before implementing the weighty decision the computer must obtain simple yes—no style confirmation from a human source.

"Automatically" means "without any human intervention."

The term "real time" includes any time frame of sufficiently short duration as to provide reasonable response time for information processing as described. Additionally, the term "real time" includes what is commonly termed "near real time," generally any time frame of sufficiently short duration as to provide reasonable response time for on-demand information processing as described (e.g., within a portion of a second or within a few seconds). These terms, while difficult to precisely define, are well understood by those skilled in the art.

What is claimed is:

1. A method comprising:
   determining a set of replicas that have stored a first set of commands only on random access memory;
   determining a first subset of replicas in the set of replicas, wherein the first subset of replicas are fully updated replicas, and wherein a fully updated replica has incorporated previous commands;
   designating a leader replica in the of set replicas, based on the leader replica receiving a message from a subset of the first subset of replicas, wherein designating the leader replica is based, at least in part, on a quorum of the first subset of replicas, and wherein the quorum is a majority of the first subset of replicas;
   repopulating a second subset of replicas, that is experiencing a split-brain condition, in the set of replicas based, at least in part, on a second set of commands received by the leader replica, wherein the split-brain condition is an inconsistency among the set of replicas; and
   writing the second set of commands received by the leader replica to a memory disk.

2. The method of claim 1, wherein designating the leader replica is based, at least in part, on all replicas in the set of replicas.

3. The method of claim 1, wherein the second set of replicas have lost a state.

4. The method of claim 1, wherein the set of replicas employ Paxos protocols.

5. A computer program product comprising:
   a computer-readable storage medium, wherein the computer-readable storage medium is not a transitory signal per se, having stored thereon:
   first instructions executable by a device to cause the device to determine a set of replicas that have stored a first set of commands only on random access memory;
   second instructions executable by a device to cause the device to determine a first subset of replicas in the set of replicas, wherein the first subset of replicas are fully updated replicas, and wherein a fully updated replica has incorporated previous commands;
   third instructions executable by a device to cause the device to designate a leader replica in the set of replicas, based on the leader replica receiving a message from a subset of the first subset of replicas, wherein designating the leader replica is based, at least in part, on a quorum of the first subset of replicas, and wherein the quorum is a majority of the first subset of replicas;
   fourth instructions executable by a device to cause the device to repopulate a second subset of replicas in the set of replicas, that is experiencing a split-brain condition, based, at least in part, on a second set of commands received by the leader replica, wherein the split-brain condition is an inconsistency among the set of replicas; and
   fifth instructions executable by a device to cause the device to write the second set of commands received by the leader replica to a memory disk.

6. The computer program product of claim 5, wherein second instructions to designate the leader replica are based, at least in part, on all replicas in the set of replicas.

7. The computer program product of claim 5, wherein the second set of replicas have lost a state.

8. The computer program product of claim 5, wherein the set of replicas employ Paxos protocols.

9. A computer system comprising:
- a processor set; and
- a computer-readable storage medium, wherein the computer-readable storage medium is not a transitory signal per se;
- wherein the processor set is structured, located, connected, and/or programmed to execute instructions stored on the computer-readable storage medium; and the instructions include:
- first instructions executable by a device to cause the device to determine a set of replicas that have stored a first set of commands only on random access memory;
- second instructions executable by a device to cause the device to determine a first subset of replicas in the set of replicas, wherein the first subset of replicas are fully updated replicas, and wherein a fully updated replica has incorporated previous commands;
- third instructions executable by a device to cause the device to designate a leader replica in the set of replicas, based on the leader replica receiving a message from a subset of the first subset of replicas, wherein designating the leader replica is based, at least in part, on a quorum of the first subset of replicas, and wherein the quorum is a majority of the first subset of replicas;
- fourth instructions executable by a device to cause the device to repopulate a second subset of replicas in the set of replicas, that is experiencing a split-brain condition, based, at least in part, on a second set of commands received by the leader replica, wherein the split-brain condition is an inconsistency among the set of replicas; and
- fifth instructions executable by a device to cause the device to write the second set of commands received by the leader replica to a memory disk.

10. The computer system of claim 9, wherein the second set of replicas have lost a state.

11. The computer system of claim 9, wherein the set of replicas employ Paxos protocols.

* * * * *